United States Patent [19]
Masaki

[11] Patent Number: 6,053,833
[45] Date of Patent: Apr. 25, 2000

[54] TRANSMISSION, AND VEHICLE AND BICYCLE USING THE SAME

[75] Inventor: Ryoso Masaki, Hitachi, Japan

[73] Assignee: Hitachi, Ltd., Japan

[21] Appl. No.: 09/253,127

[22] Filed: Feb. 19, 1999

[30]     Foreign Application Priority Data

Feb. 19, 1998   [JP]   Japan ................................. 10-037005

[51] Int. Cl.⁷ ..................................................... B60L 7/00
[52] U.S. Cl. .................................................... 475/2; 475/5
[58] Field of Search ............................... 475/2, 5

[56]          References Cited
       U.S. PATENT DOCUMENTS

| | | | |
|---|---|---|---|
| 5,120,282 | 6/1992 | Fjallstrom | 475/5 |
| 5,931,757 | 8/1999 | Schmidt | 475/2 |
| 5,935,035 | 8/1999 | Schmidt | 475/5 |
| 5,947,855 | 9/1999 | Weiss | 475/5 |

*Primary Examiner*—Dirk Wright
*Attorney, Agent, or Firm*—Evenson McKeown Edwards & Lenahan P.L.L.C.

[57]            ABSTRACT

Disclosed herein is a transmission comprising a mechanism for distribution energy of a drive source into a plurality of differential mechanisms; a plurality of motors connected to said plurality of differential mechanisms, respectively; and a mechanism for combining energies outputted from said plurality of differential mechanisms.

26 Claims, 12 Drawing Sheets

FIG.9
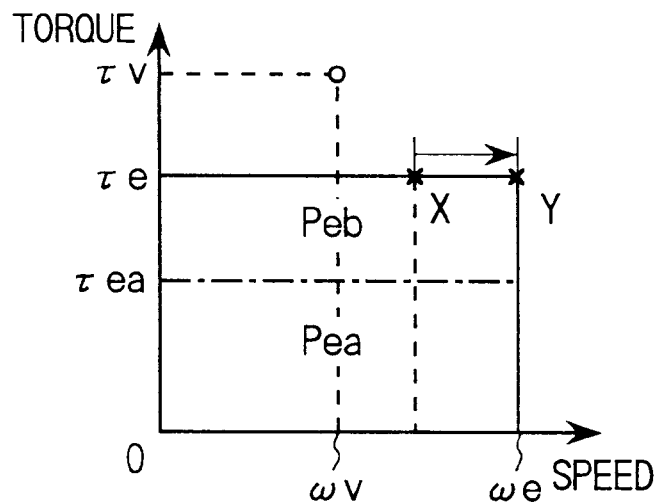
(A) EXAMPLE IN WHICH OPERATIONAL POINT OF ENGINE IS CHANGED FOR CHARGING BATTERY
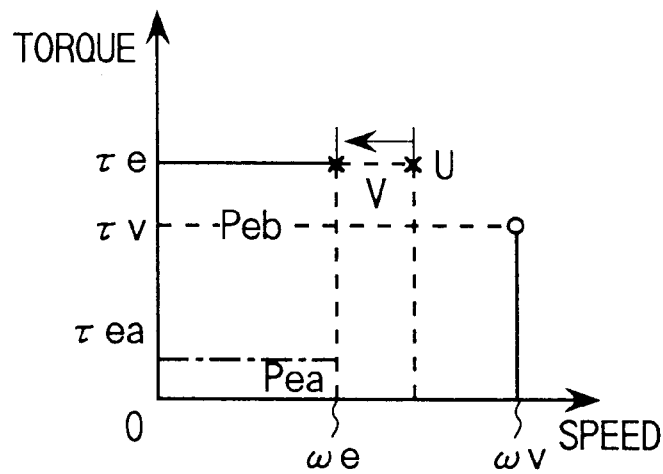
(B) EXAMPLE IN WHICH OPERATIONAL POINT OF ENGINE IS CHANGED FOR ASSISTING MOTOR USING POWER OF BATTERY

TRANSMISSION, AND VEHICLE AND BICYCLE USING THE SAME

BACKGROUND OF THE INVENTION

The present invention relates to a transmission including motors and differential mechanisms, and a vehicle and a bicycle using the same.

A hybrid car utilizing a drive force of a motor has been known as a drive system aimed at reducing a fuel consumption of an engine. Various kinds of hybrid cars have been proposed, for example, a series hybrid type, a parallel hybrid type, and a series/parallel hybrid type using two motors and one planetary gear. Concretely, Japanese Patent Laid-open No. Hei 7-135701 discloses a method in which a drive force of an engine is inputted in a planetary gear and a vehicle is driven by a drive force obtained by an output shaft of the planetary gear, wherein the drive force is controlled by a generator. In this method, since part of the energy of the engine is used for generating electric energy by the generator and the drive force of the engine is assisted by the motor connected to the output shaft, the engine can be usually driven in a high-efficiency/high-torque region and the vehicle can attain a transmission function. The same principle has been also disclosed in Japanese Patent Laid-open Nos. Sho 49-112067 and Sho 58-191364. This known method disclosed in the above documents is hereinafter referred to as "a first method".

As disclosed in Japanese Patent Laid-open No. Sho 60-95238, there has been proposed a method in which a drive force of an engine is transmitted to right and left drive wheels via planetary gears controlled by motors, respectively. This method is hereinafter referred to as "a second method".

As disclosed in Japanese Patent Laid-open No. Sho 57-47054, there has been proposed a method in which a plurality of planetary gears are driven by motors respectively and a drive force is outputted from the selected one of the plurality of planetary gears, so that the optimum drive of the motors can be performed in accordance with the operational point of the vehicle at all times. This method is hereinafter referred to as "a third method".

As disclosed in "Alternative Cars in the 21st Century —A New Personal Transportation Paradigm—, Robert Q. Riley, Published by Society of Automotive Engineers, Inc., 400 Commonwealth Drive Warrendale, Pa. 15096-0001, U.S.A., p.149–P153", there has been proposed a transmission using a continuously variable transmission CVT in combination with a planetary gear. In this method, since the vehicle can be stopped while the engine is rotated, without using of any clutch, by setting a speed varying ratio of the continuously variable transmission CVT at a specific value, it is possible to smoothly start the vehicle only by controlling the speed varying ratio of the continuously variable transmission CVT. This method is hereinafter referred to as "a fourth method".

The first method, however, has a problem. Since electric energy is generated by the generator and the vehicle is driven by the motor for realizing the transmission function, a loss in electric energy occurs. As a result, although the engine can be always driven at an operational point being good in efficiency, the efficiency of the entire vehicle is reduced correspondingly to the loss in electric energy.

The second method, in which the planetary gears are provided for the right and left different output shafts, respectively, has a configuration obtained by extending the configuration of a usual parallel hybrid car to the right and left wheels. As a result, the second method requires the input/output of electric energy for realizing the speed varying operation, and therefore, this method has the same problem as described above.

The third method has a configuration obtained by extending the configuration of the first method. As a result, this method has the same problem as described above in terms of the loss in electric energy.

The fourth method has a problem that since the engine must be always rotated for driving the vehicle, there is a limitation in reducing the fuel consumption per unit running distance over a period, in which the engine is driven, including a stop of the vehicle.

SUMMARY OF THE INVENTION

In view of the foregoing, the present invention has been made, and a first object of the present invention is to provide a transmission capable of realizing a continuously variable transmission function using motors, and enhancing the transmission efficiency by minimizing a loss in electric energy.

A second object of the present invention is to provide a vehicle using the above transmission, which is capable of reducing the fuel consumption per unit running distance.

A third object of the present invention is to provide a bicycle capable of reducing fatigue of a driver.

The above first object can be achieved by provision of a transmission including: a mechanism for distributing energy of a drive source into a plurality of differential mechanisms; a plurality of motors connected to the plurality of differential mechanisms, respectively; and a mechanism for combining energies outputted from the plurality of differential mechanisms.

The above first object can be also achieved by provision of a transmission including: a plurality of differential mechanisms in each of which a difference in the number of rotation between an input shaft and an output shaft is controlled by a motor; wherein the input shafts of the plurality of differential mechanisms are taken as a common shaft, and the output shafts of the plurality of differential mechanisms are taken as a common shaft.

Gear ratios between the common input shaft and the common output shaft of the plurality of differential mechanisms are preferably set at different values. This makes it possible to provide a system capable of enhancing the efficiency.

The second object can be achieved by provision of a vehicle including: an engine for generating a drive force for driving a vehicle; first and second planetary gears each of which is composed of a sun gear, a planetary element, and a ring gear; and first and second motors for controlling the sun gears of the first and second planetary gears, respectively; wherein one of the planetary element and the ring gear of each of the first and second planetary gears is connected to an input shaft driven by the engine and the other is connected to an output shaft for driving a vehicular body.

The third object can be achieved by provision of a bicycle including: first and second differential mechanisms each of which includes an input shaft driven by a driver and an output shaft composed of wheels; and first and second motors for controlling the first and second differential mechanisms, respectively.

BRIEF DESCRIPTION OF THE DRAWINGS

FIGS. 9(a) to 9(b) are Torque-speed characteristic diagrams showing methods of changing the operational point of an engine for charging a battery and assisting the motor drive by the energy of the battery while driving the vehicle under the CVT mode, respectively;

DETAILED DESCRIPTION OF THE PREFERRED EMBODIMENTS

Hereinafter, one embodiment of the present invention will be described with reference to FIG. 1.

Figure 1:
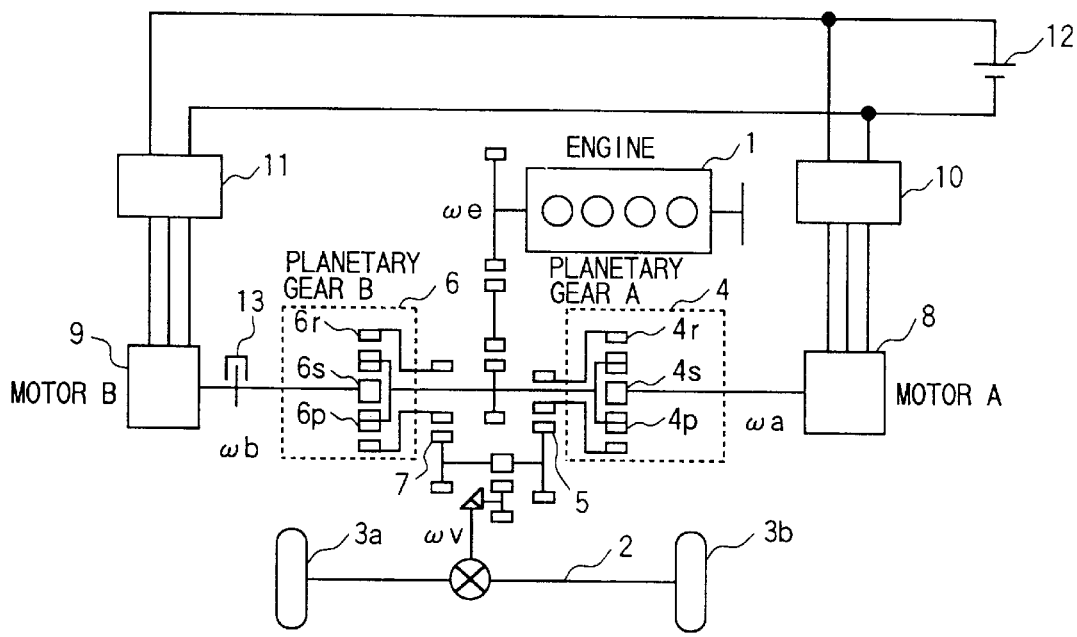
FIG. 1 is a configuration view showing one embodiment in which the present invention is applied to a hybrid car of a type in which the transmission function is realized using two planetary gears each having a sun gear controlled by a motor.

FIG. 1 shows a car of a type in which a vehicular body is driven by rotating tires $3a$ and $3b$ via a drive shaft 2 using energy of an engine 1. Planetary gears A4 and B6, which are essential composing elements of the present invention, are composed of a combination of a sun gear $4s$, a planetary element $4p$ and a ring gear $4r$, and a combination of a sun gear $6s$, a planetary element $6p$ and a ring gear $6r$, respectively. The sun gears $4s$ and $6s$ are driven by motors A8 and B9 controlled by power converters 10 and 11, respectively. A battery 12 is used for supplying energy required for these motors A8 and B9 or storing energy generated by the motors A8 and B9. The planetary elements $4p$ and $6p$ are both fastened to the same input shaft, so that a drive torque of the engine 1 is distributed into the planetary gears A4 and B6. On the output sides of the ring gears $4r$ and $6r$ are arranged gears having different gear ratios. To be more specific, a gear 5 having a large gear ratio and a gear 7 having a small gear ratio are arranged on the output sides of the ring gears $4r$ and $6r$, respectively. These gears 5 and 7 are connected to the common output shaft, so that output torques $\tau va$ and $\tau vb$ outputted from the planetary gears A4 and B6 are synthesized into a vehicle drive torque $\tau v$ at the common output shaft. With this configuration, the vehicle can be accelerated/decelerated as required by a driver. Also the vehicle drive torque $\tau v$ and an engine speed we can be adjusted by driving the sun gears $4a$ and $6s$ under control of motor toques $\tau a$ and $\tau b$ and motor speeds $\omega e$ and $\omega b$ of the motors A8 and B9 using the power convertors 10 and 11.

Figure 2:
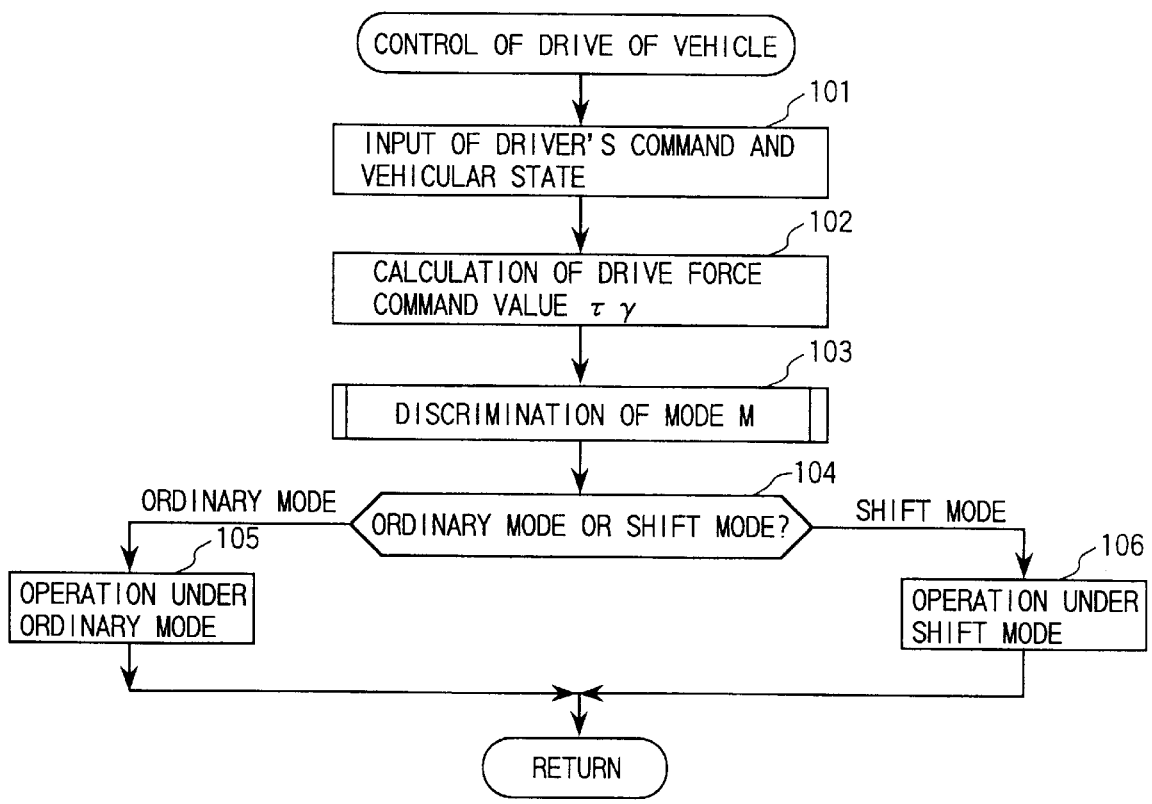
FIG. 2 is a flow chart showing the outline of a control method for driving the hybrid car shown in FIG. 1.

Next, a basic operational method for controlling the engine 1 and motors A8 and B9 shown in FIG. 1 will be described using a flow chart shown in FIG. 2. At step 101 shown in FIG. 2, inputted are operational commands determined by a driver, for example, an accelerator actuated amount Xa, a brake actuated amount Xb, and a changeover signal Xc indicating a forward, backward, or neutral mode; and also a vehicular speed $\omega v$, a charging state of the battery 12, a temperature of each portion, and a vehicular state. At step 102, a drive force command value $\tau r$ of the vehicle is calculated on the basis of the above inputted values. Then, at step 103, a reference operational mode Mref indicating an ideal operating method is determined on the basis of the vehicle drive force command value $\tau r$ and the vehicular speed $\omega v$.

Figure 3:
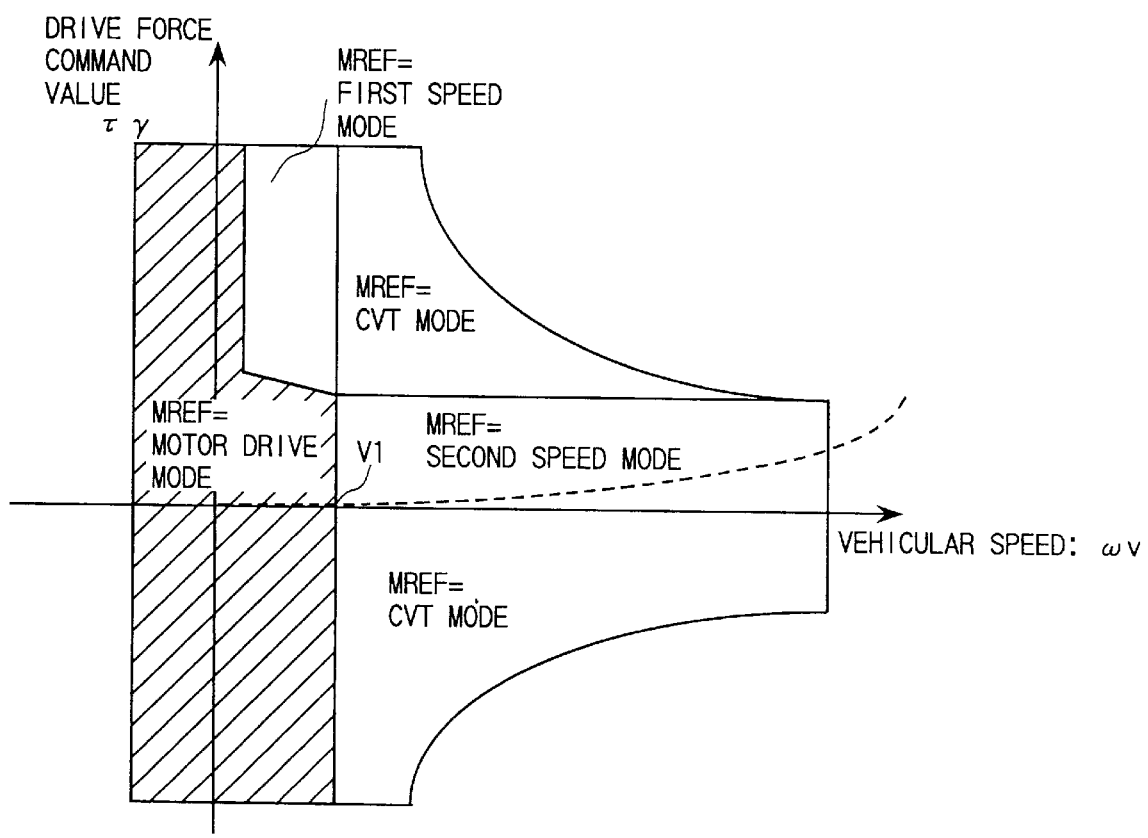
FIG. 3 is a drive force-vehicular speed characteristic diagram showing a range of operational points for determining an ideal mode to be operated on the basis of the existing drive state.

For example, as shown in FIG. 3, upon running of the vehicle at a low vehicular speed $\omega v$ or upon backward movement of the vehicle, a motor drive mode is selected in which the engine 1 is stopped and the vehicle is driven only by the motors A8 and B9. In FIG. 3, a region other than the motor drive mode shown by hatching involves a first speed mode, a second speed mode, and a CVT mode in each of which the engine 1 is started and the vehicle is driven using a drive force of the engine 1. When the vehicular speed $\omega v$ is low and a drive force is required, the first speed mode for controlling the speed-change ratio at a value equivalent to a low gear ratio is selected. When the vehicular speed $\omega v$ is medium or more and the necessary toque is low, the second speed mode capable of enhancing the engine efficiency is selected. When the vehicular speed $\omega v$ is medium or more and a high torque is required, the CVT mode capable of obtaining a high toque drive force by adding the drive torque of the motor is selected. In addition, when the drive force command value $\tau r$ is negative, the CVT mode may be desirably selected in order to store regenerative energy in the battery 12 using the motors A8 and B9 as generators.

Incidentally, the operational modes shown in FIG. 3 are not necessarily fixed but can be suitably changed depending on the charging state or the temperature of the battery 12. The actual operational mode M is determined on the basis of the existing operational mode and the reference operational mode Mref obtained in accordance with the above manner. For example, even if the reference operational mode Mref becomes the first speed mode in a state in which the vehicle is driven under the motor drive mode, since the engine 1 cannot be rapidly driven, an operation for starting the engine 1 must be performed. Further, if the start-up/stop of the engine 1 is excessively repeated, the fuel consumption is rather increased. Accordingly, when the engine 1 is started or stopped under a new operational mode changed from the previous one, an operation for keeping the new operational mode for a specific period of time is performed. The calculation taking the above specific operations into account is performed at step 103, to thus determine the operational mode M on the basis of the existing operational mode and the reference operational mode Mref.

At step 104, it is judged whether the operational mode M is the ordinal mode shown in FIG. 3 or a shift mode for changing an operational mode to another one. On the basis of the judgement, the process goes on to step 105 at which the operation under the ordinary mode is performed or to step 106 at which the operation under the shift mode is performed.

Figure 4:
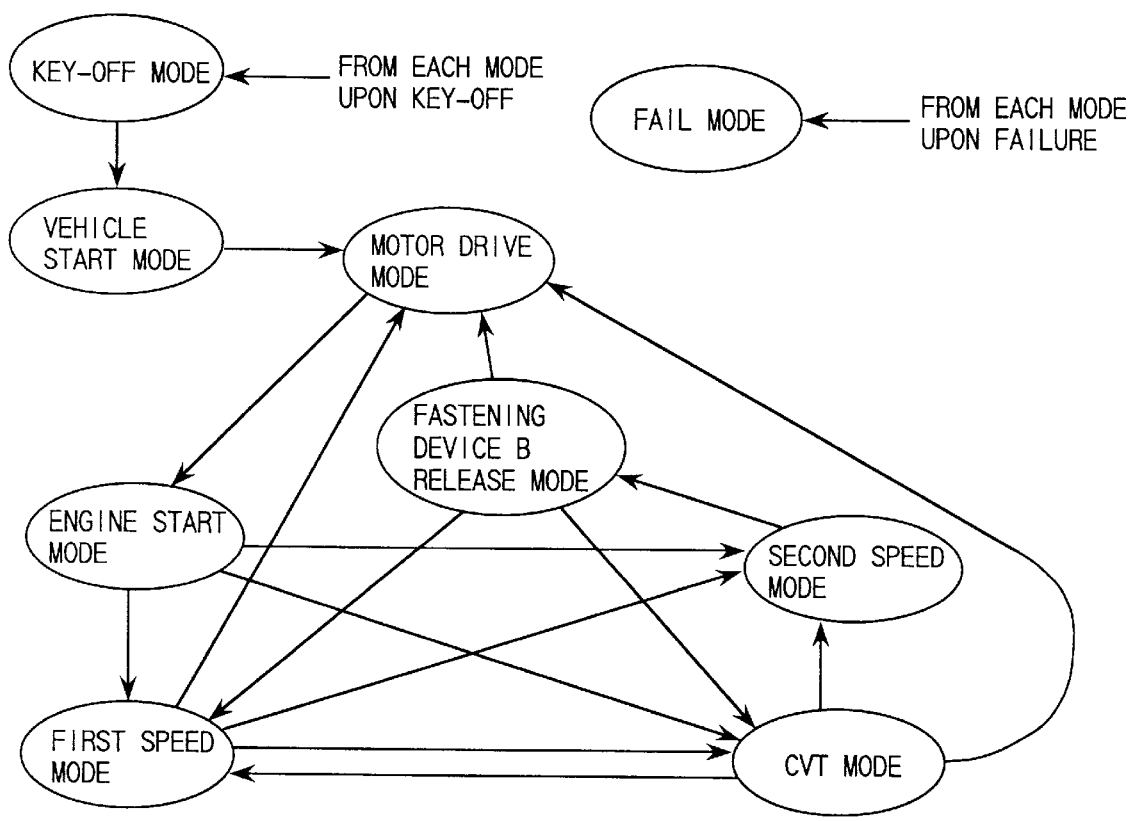
FIG. 4 is a state transition diagram showing a transition method between operational modes upon drive of the hybrid car shown in FIG. 1.

FIG. 4 shows a state transition diagram representative of the state transition of the operational mode M. The ordinary modes involve the motor drive mode, first speed mode, second speed mode, and CVT mode. The shift modes involve an engine start mode and a fastening device B release mode. A key-off mode represents a state in which the key is turned off. If the key is turned on, the key-off mode is changed into the vehicle start mode in which each controller is turned into a controllable state. After the operation for starting all of the controllers is completed, the vehicle start mode is changed into the motor drive mode in which the motor A8 and B9 are rotated by operating an accelerator by a driver and the vehicle is turned into a drivable state. When the vehicular speed Wv becomes a medium speed or more, or a large drive force is required, it is necessary for changing the motor drive mode into either of the first speed mode, second speed mode, and CVT mode. At this time, the motor drive mode is changed, via the engine start mode for starting the engine, which is one of the shift modes, into a specific ordinary mode in which the vehicle is driven using the drive force of the engine. The change between the first speed mode, second speed mode and CVT mode can be basically performed not by way of any shift mode; however, in this embodiment adopting a fastening manner to be described later, there is used a method in which the second speed mode is changed into another ordinary mode by way of the locking device B release mode which is one of the shift modes. In addition, if there occurs any failure, the operational mode is changed into a fail mode associated with the failure, in which an operation suitable for coping with the failure is performed. Further, when the key is turned off, an operation for safely stopping the vehicle is performed, and thereafter the control is stopped under the key-off mode.

Next, the operation under each of the ordinary modes shown in FIG. 2 will be described in detail with reference to FIG. 5. For an easy understanding of the description, there are shown the following equations 1 to 10 given in the system configuration shown in FIG. 1.

Kp is a constant which is defined by the number of teeth on the planetary gears A4 in FIG. 1. As shown in the equation 1, Kp is a ratio between an engine speed $\omega e$ and a motor A speed $\omega a$ when a vehicular speed $\omega v$ is zero. Kp is calculated by $\omega e / \omega a$ when $\omega v = 0$.

$$\omega e = kp \omega a + ka \omega v \quad \text{Equation 1}$$

$$\omega e = kp \omega b + kb \omega v \quad \text{Equation 2}$$

$$\tau e = \tau ea + \tau eb \quad \text{Equation 3}$$

$$\tau v = \tau va + \tau vb \quad \text{Equation 4}$$

$$\tau ea = \tau a / kp = \tau va / ka \quad \text{Equation 5}$$

$$\tau eb = \tau b / kp = \tau vb / kb \quad \text{Equation 6}$$

$$Pe = Pea + Peb \quad \text{Equation 7}$$

$$Pv = Pva + Pvb \quad \text{Equation 8}$$

$$Pea = Pa + Pva \quad \text{Equation 9}$$

$$Peb = Pb + Pvb \quad \text{Equation 10}$$

In the above equations, $\omega e$, $\omega v$, $\omega a$ and $\omega b$ designate the engine speed, vehicular speed, motor A speed, and motor B speed, respectively; $\tau e$, $\tau ea$, $\tau eb$, $\tau a$, $\tau b$, $\tau v$, $\tau va$, and $\tau vb$ designate the engine torque, planetary gear A shared engine torque, planetary gear B shared engine torque, motor A torque, motor B torque, vehicular torque, planetary gear A shared vehicular torque, and planetary gear B shared vehicular torque, respectively; and Pe, Pea, Peb, Pa, Pb, Pv, Pva, and Pvb designate the engine power, planetary gear A shared input power, planetary gear B shared input power, motor A power, motor B power, vehicle drive power, planetary gear A output power, and planetary gear B output power, respectively. In addition, the relationship between the constants Ka and Kb associated with the gear ratios is given by the following equation.

$$Ka > kb \quad \text{Equation 11}$$

This means that the gear ratio between the input side and output side of the planetary gear A is larger than the gear ratio between the input side and output side of the planetary gear B.

Figure 5:
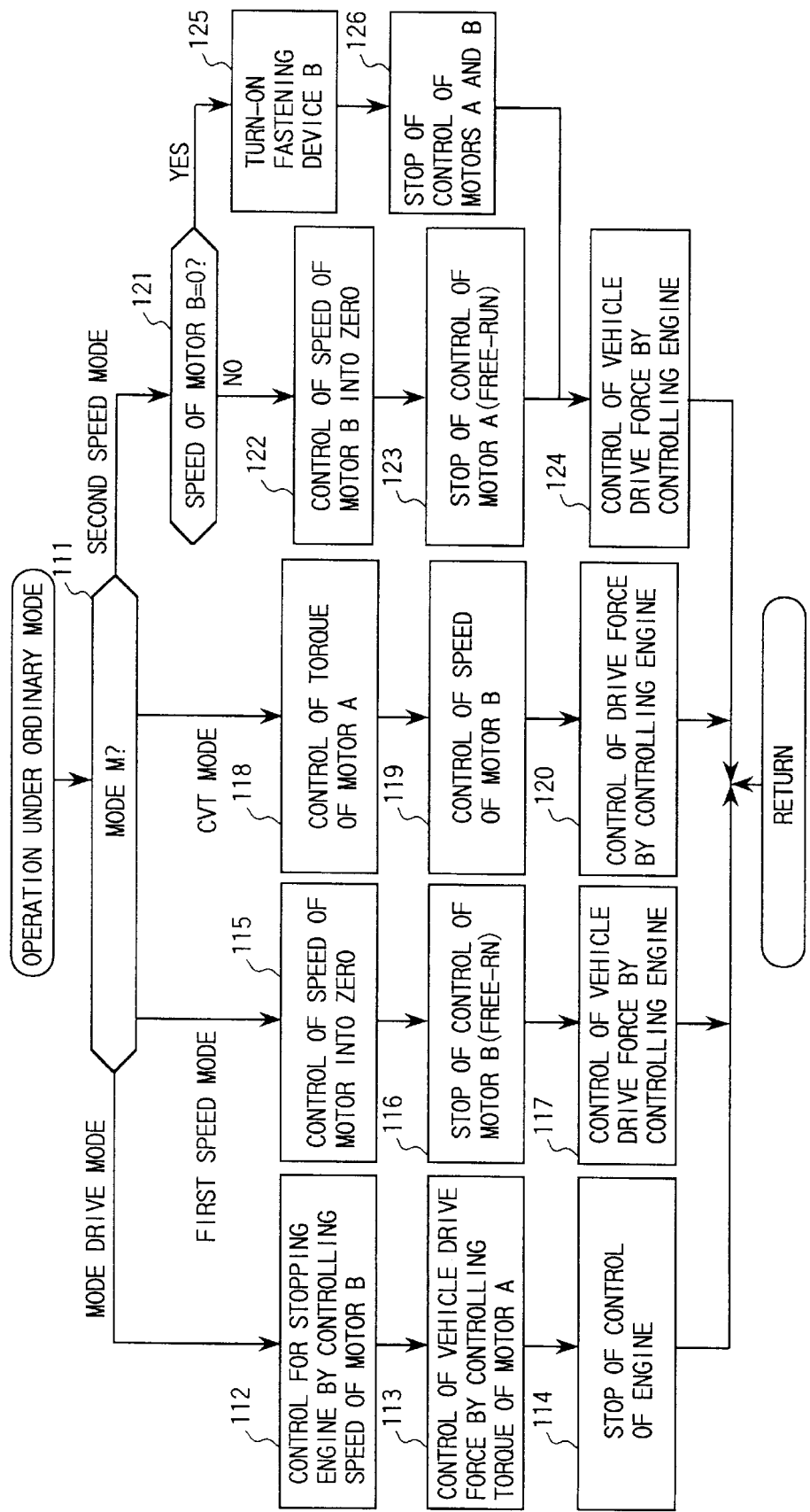
FIG. 5 is a flow chart showing a method of controlling ordinary modes shown in FIG. 2.

As described above, the ordinary modes involve the four operational modes, and at step 111 shown in FIG. 5, the operational mode M is discriminated.

In the case of the motor drive mode, operations in steps 112, 113 and 114 are performed. At step 112, in accordance with the equation 2, the motor B speed $\omega b$ is controlled in such a manner that the engine speed $\omega e$ becomes zero while the vehicular speed $\omega v$ is kept constant. At step 113, the vehicle drive torque $\tau v$ is controlled by controlling the motor A torque $\tau a$. At this time, the torque control is performed in such a manner that, with $\tau e = 0$ in the equation 3, the vehicle drive torque $\tau v$ is determined in accordance with the equations 4, 5 and 6.

From the equation 11, to satisfy the relationship of $\tau v > 0$, the vehicle is usually driven in such a manner that the motor A is in the power-running state and the motor B is in the power generating state. Of course, at step 114, an operation for continuously stopping the control of the engine is performed.

In the case of the first speed mode, an operation for controlling the motor A speed $\omega a$ into zero is performed at step 115 and an operation for stopping the control of the motor B is performed at step 116. With these operations, the motor A is turned into an electrically locked state and the motor B is turned into a free-run state, and thereby the planetary gear A4 having the large gear ratio between the input side and the output side is driven by the engine 1 in a state in which the sun gear 4s of the planetary gear A4 is fixed. That is to say, the speed-change ratio in the first speed mode is equivalent to a low gear ratio of a usual manual transmission, and accordingly, the engine torque $\tau e$ can be increased in the first speed mode. Thus, by controlling the engine at step 117, the vehicle drive torque can be controlled into a necessary value. Further, in the first speed mode, the input/output of energy to/from both the motors A8 and B9 is not performed, so that it is possible to minimize a loss in electric energy.

In the case of the CVT mode, the motor A torque $\tau a$ is controlled at step 118; the motor B speed $\omega b$ is controlled at step 119; and the power of the engine 1 is controlled by controlling the engine 1 at step 120, to thus realize the continuously variable transmission function. In addition, the operation under the CVT mode will be described in detail later with reference to FIGS. 7 to 9.

In the case of the second speed mode, operations in steps 121 to 126 are performed. First, at step 121, it is judged whether or not the motor B speed $\omega b$ becomes zero. If no, at step 122, an operation for controlling the motor B speed $\omega b$ into zero is performed. Meanwhile, at step 123, the control of the motor A is stopped, that is, the motor A is turned into a free-run state. With this control, reversely to the first speed mode, the sun gear 6s of the planetary gear B6 having the small gear ratio between the input side and the output side is fixed, and accordingly, in the second speed mode, the speed-change ratio is equivalent to a high gear ratio of a usual manual transmission. By controlling the engine in such a state at step 124, the engine 1 is always driven in a high torque region. That is to say, in the second speed mode, the highly efficient operation of the engine 1 is made possible. At this time, like the first speed mode, the input/output of energy to/from both the motors A8 and B9 is not performed, so that it is possible to minimize a loss in electric energy.

In addition, at step 121, if it is judged that the motor B speed $\omega b$ is zero, the process is jumped to step 125 at which a locking device B13 is turned on to mechanically lock the sun gear 6s. Next, at step 126, the control of the motors A8 and B9 is stopped. Then, the process goes on to the above-described step 124 at which the drive force of the vehicle is controlled by controlling the engine. With these operations, it is possible to eliminate a loss in electric energy generated by a current flowing when the motor B9 is electrically locked, and hence to further reduce the fuel consumption of the vehicle. In the case where the vehicle is driven by the engine 1, the vehicle is driven under the second speed mode for a long period of time excluding the accelerating operation, so that the prevention of the loss in electric energy in the second speed mode greatly contributes to the reduction in the fuel consumption.

Figure 6:
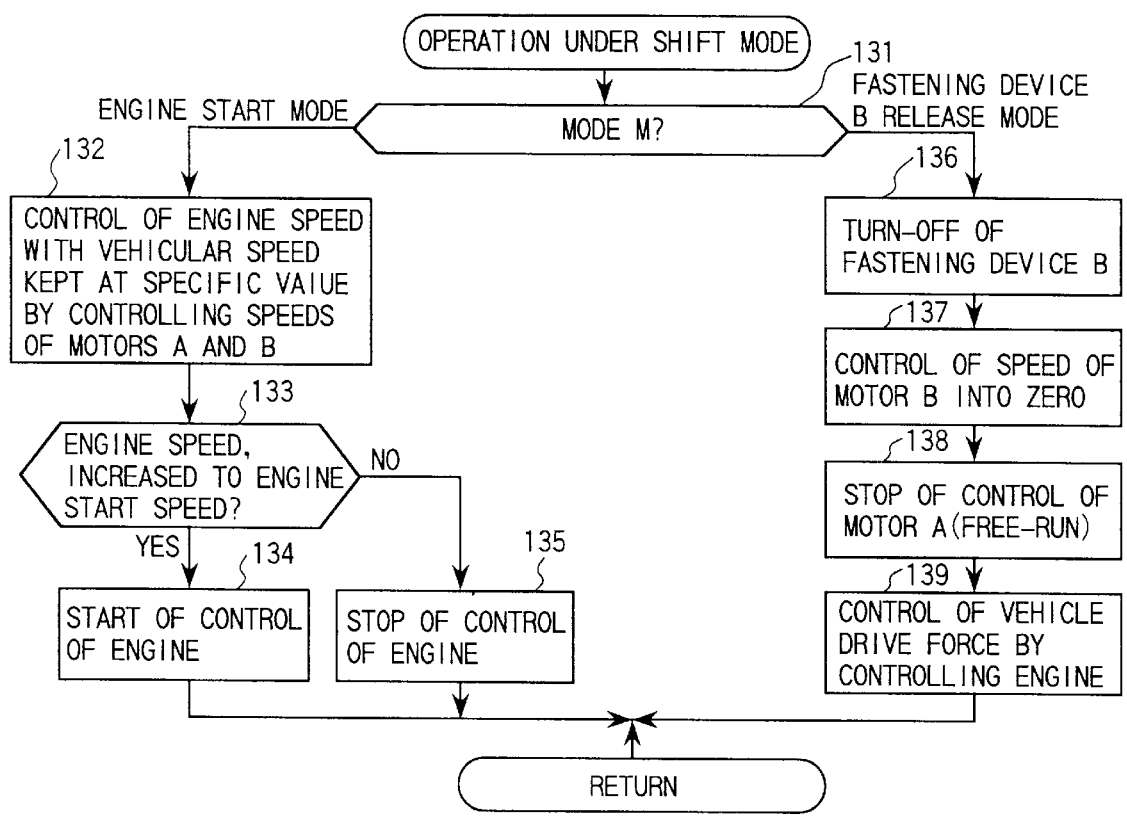
FIG. 6 is a flow chart showing a method of controlling shift modes shown in FIG. 2.

Next, the shift modes for changing an ordinary mode to another one will be described with reference to FIG. 6.

The shift modes involve the engine start mode and the locking device B release mode. At step 131, it is judged whether the shift mode is the engine start mode or the locking device B release mode. In the case of the engine start mode, operations in steps 132 to 135 are performed, and in the case of the locking device B release mode, operations in steps 136 to 139 are performed.

By way of the engine start mode, the motor drive mode which is one of the ordinary modes is changed into another ordinary mode in which the engine 1 is driven. First, at step 132, the speeds of the motors A8 and B9 are controlled. From the equations 1 and 2, the following equations 12 and 13 are given.

Kp is a constant which is defined by the number of teeth on the planetary gears A4 in FIG. 1. As shown in the equation 1, Kp is a ratio between an engine speed $\omega e$ and a motor A speed $\omega a$ when a vehicular speed $\omega v$ is zero. Kp is calculated by $\omega e/\omega a$ when $\omega v=0$.

$$\omega v = kp(\omega a - \omega b)/(ka - kb) \quad \text{Equation 12}$$

$$\omega e = kp(ka\omega b - kb\omega a)/(ka - kb) \quad \text{Equation 13}$$

The engine 1 is gradually accelerated while the vehicular speed $\omega v$ is controlled to be kept at the existing value in accordance with the equations 12 and 13. With this control, the engine speed $\omega e$ can be increased up to a specific engine start speed without occurrence of any variation in vehicular torque due to start-up of the engine. As is apparent from the equations 12 and 13, the above control is not dependent on the magnitude of the vehicular speed $\omega v$ and the engine 1 can be started even in the stop state or running state. In this way, although the vehicle in this embodiment is of a clutchless type, the engine can be usually started or stopped while preventing occurrence of shock due to start-up of the engine. Next, at step 133, it is judged whether or not the speed of the engine 1 reaches a specific engine start speed. If no, at step 135, the control of the engine is left as stopped. If the engine speed sufficiently reaches the engine start speed, at step 134, the control of the engine is started, to complete the change from the motor drive mode into an ordinary mode in which the drive of the engine 1 is controlled.

The locking device B release mode is performed to change the second speed mode into another mode as shown in the state transition diagram of FIG. 4. First, at step 136, the locking device B is turned off, to release the mechanical locking state of the sun gear 6s. At step 137, the motor B speed $\omega b$ is controlled into zero. With this control, it is possible to prevent a variation in vehicle drive torque $\tau v$ due to release of the locking device B. At step 138, the control of the motor A is left as stopped. And, at step 139, the vehicle drive torque $\tau v$ is controlled by controlling the engine. That is to say, by carrying out the same control as that in the second speed mode with the locking device B released, it is possible to prevent occurrence of shock due to the change in operational mode.

In addition, in the case where two ordinary modes are directly changed to each other not by way of the shift mode, the method of controlling the motor is possibly changed, and accordingly, upon the change in operational mode, the initial value of the control in the new mode may be matched with the associated value of the control in the previous mode. This is effective to prevent a variation in torque due to the change in operational mode.

Figure 7:
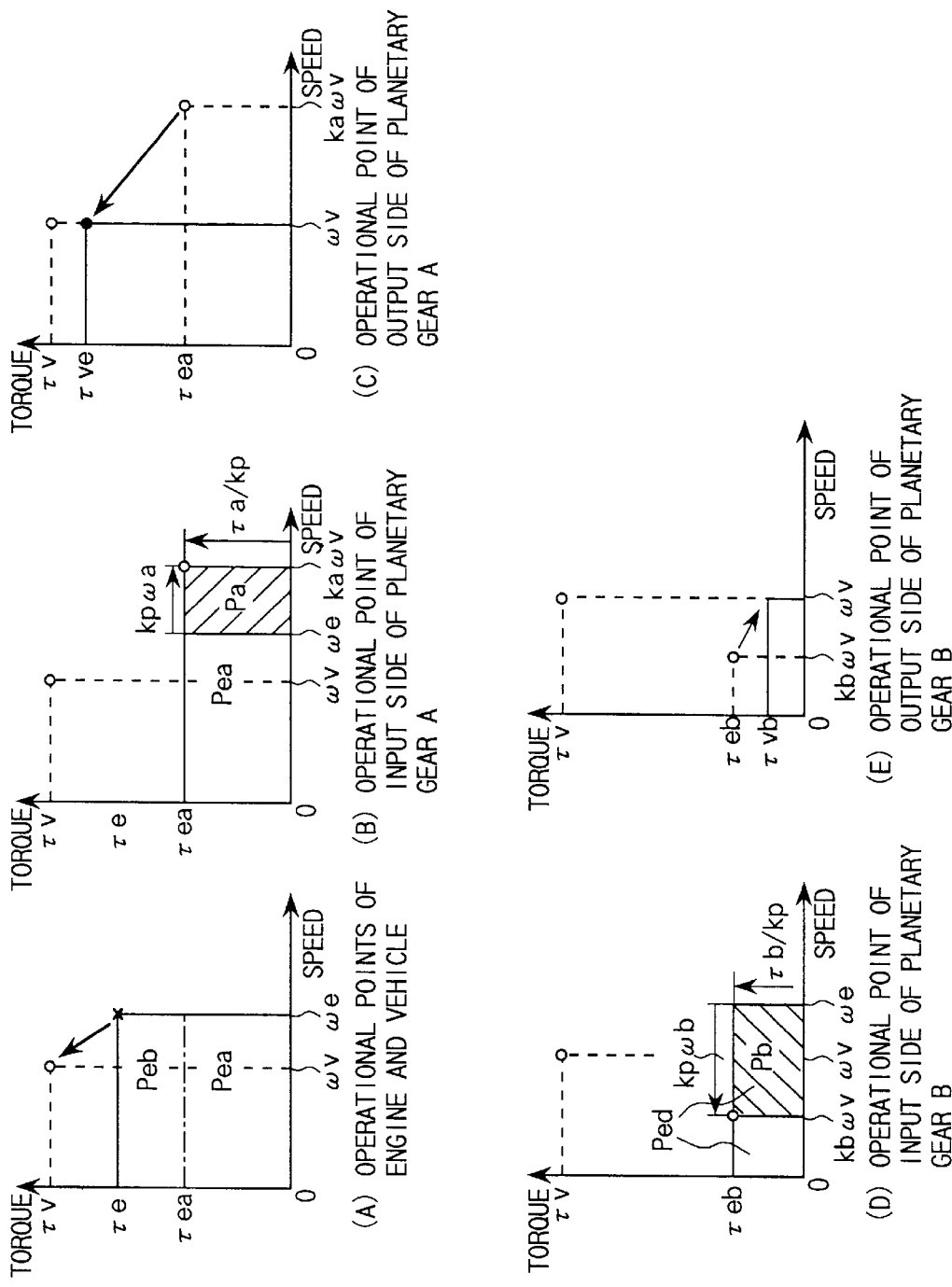
FIGS. 7(a) to 7(e) are Torque-speed characteristic diagrams showing the flows of energies and relationships among the speed and torque for an engine, motor and planetary gears when the vehicle is driven with the increased gear ratio under a CVT mode.
Figure 8:
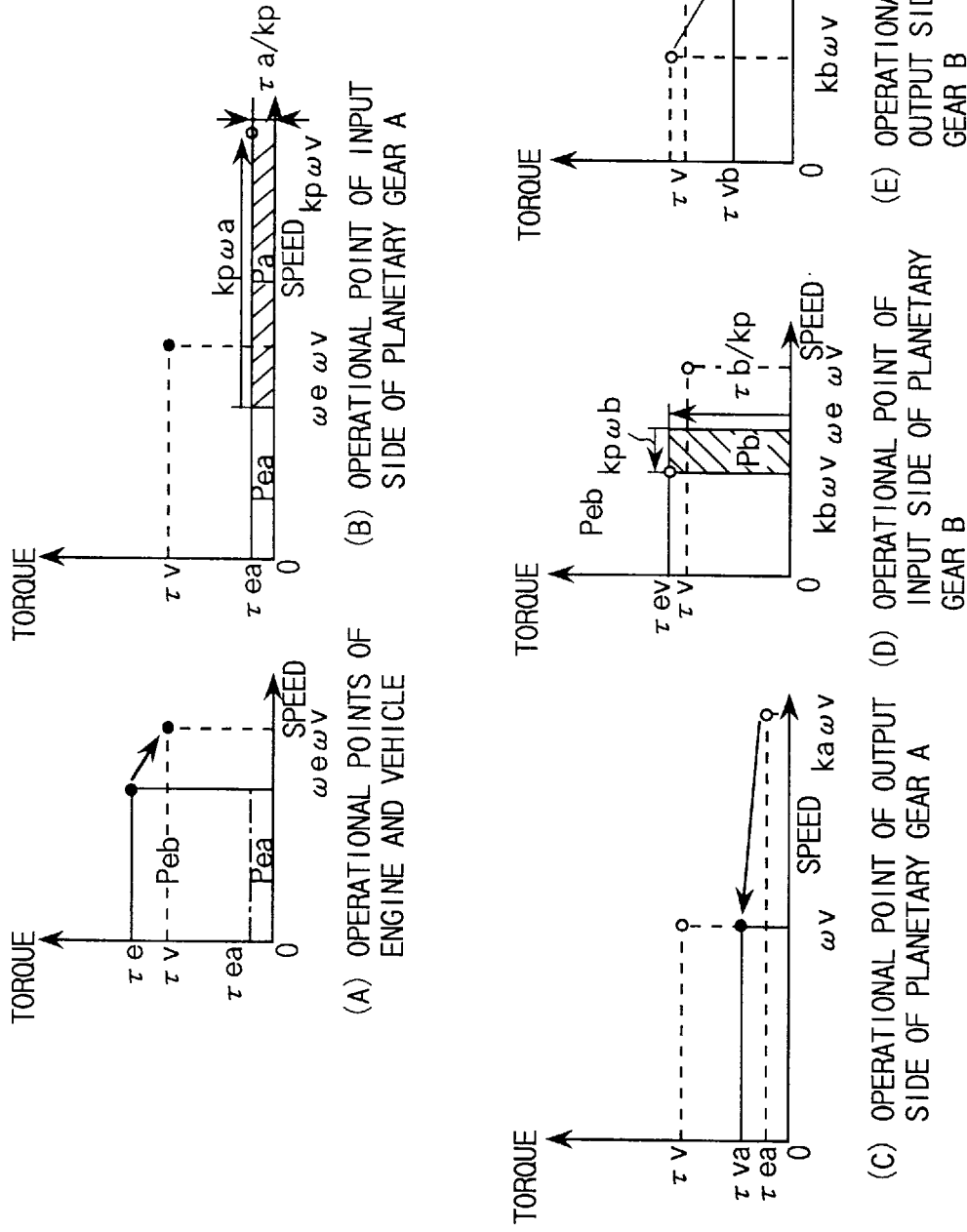
FIGS. 8(a) to 8(e) are Torque-speed characteristic diagrams showing the flows of energies and relationships among the speed and torque for the engine, motor and planetary gears when the vehicle is driven with the decreased gear ratio under the CVT mode.

Next, it will be described in detail how to realize the continuously variable transmission function in the above-described CVT mode by the system configuration shown in FIG. 1 with reference to the flows of energies shown in FIGS. 7 and 8. In these figures, it is assumed that the constant ka=2 and the constant kb=0.5. Accordingly, the gear ratio in the first speed mode becomes 2, and the gear ratio in the second speed mode becomes 0.5. And, the operation under the CVT mode for obtaining an arbitrary speed varying ratio in the intermediate region between the above ratios, that is, between 0.5 to 2 will be described below.

FIGS. 7(a) to 7(e) are torque-speed characteristic diagrams illustrating operational points of the engine, vehicle, and planetary gears A and B in the case where the speed varying ratio is set in a range of 0.5 to 1.0. As shown in FIG. 7(a), in the case where with respect to an operational point X of the engine, an operational point O of the vehicle to be driven is offset on the lower speed/higher torque side (upper left side in the figure), the planetary gear A input power Pea and the planetary gear B input power Peb are distributed from the engine power Pe into the planetary gears A4 and B6, respectively. The input speed of the planetary gear A4 is the same as that of the planetary gear B6 because both the planetary gears A4 and B6 are connected to the common input shaft. Accordingly, the above respective powers inputted in the planetary gears A4 and B6 are determined by dividing the engine torque $\tau e$ into the planetary gear A shared engine torque τea and the planetary gear B shared engine torque τeb. In addition, the above divided ratio of the power is determined not by only control of one motor but by the entire energy balance. The operational point □ of the input side of the planetary gear A shown in FIG. 7(b) is determined by adding the motor A power Pa inputted by drive of the sun gear 4s using the motor A8 to the planetary gear A input power Pea inputted from the engine. Since the input/output of the energy is carried out by increasing/decreasing the speed of the planetary gear, the additional energy is indicated in the abscissa (in the direction of speed) in FIG. 7(b). As shown in FIG. 7(c), on the output side of the planetary gear A4, the speed is reduced depending on the gear ratio ka=2, so that the vehicular speed ωv becomes one-half the value kaωv, and the planetary gear A shared vehicular torque τva becomes twice the planetary gear A shared engine torque τea. That is to say, the operational point □ is changed into an operational point Δ.

Similarly, FIG. 7(d) shows the flow of the energy of an operational point □ on the input side of the planetary gear B. The motor B9 is operated to reduce its speed on the output side, by the sun gear 6s to which the planetary gear B input power Peb is applied, and therefore, the motor B9 is turned into a power generating state. Accordingly, the operational point □ is moved for a value equivalent to the motor B power Pb, that is, moved to a position shown in FIG. 7(d). On the output side of the planetary gear B6, the speed of the planetary gear B6 is increased depending on the gear ratio kb=0.5, and accordingly, as shown by the change from the operational point □ into an operational point A in FIG. 7(e), the vehicular speed ωv becomes twice, and the planetary gear B shared vehicular torque τvb becomes half. The vehicular torque τv is the total of the planetary gear A shared vehicular torque τva and the planetary gear B shared vehicular torque τvb, and therefore, the vehicle is operated at an operational point ○ shown in FIG. 7(a). With this operational principle, the operational point of the engine 1 can be speed-changed in a low speed/high torque region. It is revealed that the operational point of the vehicle can be freely controlled with the operational point of the engine 1 kept constant by controlling the power of each motor. Also by matching the absolute value of the power Pa driven by the motor A with the absolute value of the power Pb generated by the motor B, it is possible to eliminate the necessity of the operation of charging/recharging the battery 12 and hence to make smaller the capacity of the battery. This is effective to reduce the weight of the vehicle. In addition, the first speed mode is equivalent to a mode in which the motor A speed ωa is zero and the motor B torque τb is zero in FIGS. 7(a) to 7(e). That is to say, the first speed mode may be considered as a special case of the CVT mode.

FIGS. 8(a) to 8(e) are torque-speed characteristic diagrams showing operations of the engine, vehicle, and planetary gears A and B in the case where the speed varying ratio is set in a range of 1 to 2. FIG. 8(a) shows an operational principle in the case where an operational point X of the engine is speed-changed into an operational point ○ of the vehicle. Operational points of the planetary gear A on the input and output sides shown in FIGS. 8(b) and 8(c) are shifted to the higher speed/lower torque sides as compared with those shown in FIGS. 7(b) and 7(c), respectively. The motor A8 is driven at a high speed and with a low torque. On the contrary, as shown in FIGS. 8(d) and 8(e), the operational points of the planetary gear B on the input and output sides are set such that the motor B speed ωb is smaller and the motor B torque τb is larger as compared with those shown in FIGS. 7(d) and 7(e), respectively. In the second speed mode, the motor A torque τa is zero and the motor B speed ωb is zero, and accordingly, it is possible to attain the continuously variable transmission function by controlling the motors A and B in a region from the first speed mode to the second speed mode. With this configuration, since the control with the minimum gear ratio is performed in an ordinary low torque operation, the engine 1 can be driven at the high torque/high efficient operational point, and also if a high torque is required, the mode is rapidly changed into the CVT mode, with a result that there can be obtained a comfortable driving characteristic.

FIGS. 9(a) and 9(b) show examples in each of which the operational point of the engine is changed for controlling the vehicle in such a manner as to realize a high output hybrid car making effective use of the battery 12 mounted on the vehicle. FIG. 9(a) is a characteristic diagram obtained when the operational point X of the engine shown in FIG. 7(a) is changed from a point X to a point Y. When the motors A and B are controlled with an operational point ○ of the vehicle kept constant, the energy generated by the engine 1 becomes excessive, with a result that the power Pa of the motor A necessary for driving the vehicle is reduced and the absolute value of the power Pb of the motor B for generating electric energy is increased. The excess energy thus obtained by high efficient drive of the engine 1 is charged in the battery 12.

FIG. 9(b) shows the example in which the operational point of the engine is changed for making effective use of energy stored in the battery 12. In this example, the operational point X of the engine shown in FIG. 8(a) is changed from a point U to a point V by reducing the output of the engine with the operational point ○ of the vehicle kept constant. Concretely, to change the operational point X of the engine from the point U to the point V, the motor A speed ωa is increased to make large the motor A power Pa and the motor B speed ωb is decreased to make small the generated power. This means that the drive force of the engine is relatively assisted by the drive force of the motor. Actually, by controlling the input/output power of the battery such that the engine is driven at an operational point being good in fuel consumption, it is possible to reduce the fuel consumption.

Figure 10:
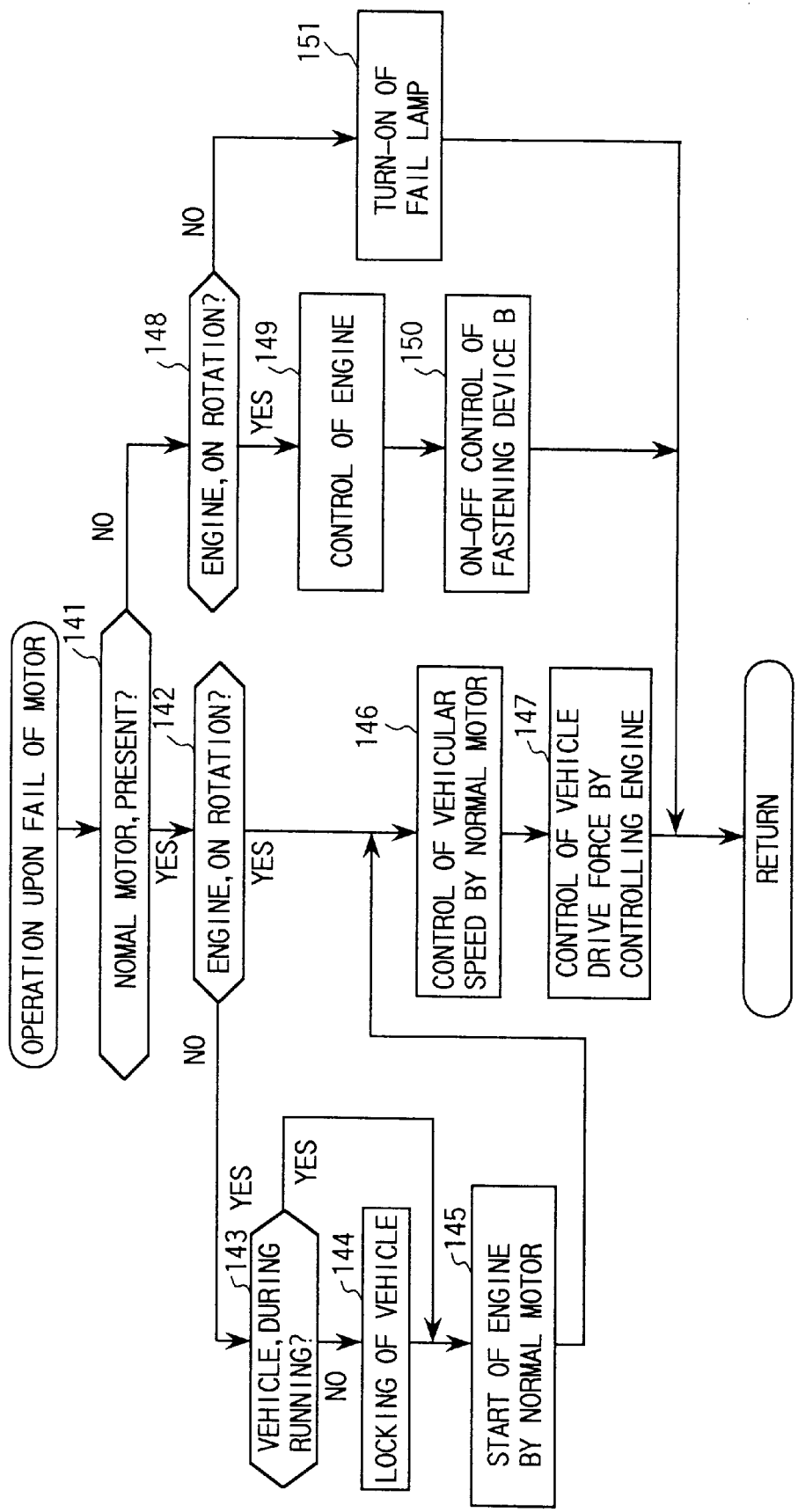
FIG. 10 is a flow chart showing operations performed in the case where a motor fails.

FIG. 10 is a flow chart showing an operational procedure performed when either of the two motors fails. At step 141, it is judged whether at least one of the two motors is normally controllable or both the motors fail. If there exists a normally operable motor, the process goes on to step 142, and if both the motors fail, the process goes on to step 148. In the case where at least one of the motors is normally controllable, at step 142, it is judged whether or not the engine 1 is on rotation. If no, the engine 1 is started by performing operations in steps 142 to 145, and then the drive of the vehicle is controlled using the engine 1 and the normally controllable motor by performing operations in steps 146 and 147. If it is judged that the engine 1 is on rotation at step 142, operations in steps 146 and 147 may be performed.

At step 143, the running state of the vehicle is judged on the basis of the vehicular speed ωv. If the vehicle is not on running, the process goes on to step 144 at which an operation for locking the tires 3a and 3b is performed to leave the vehicle as stopped. This operation can be carried out by providing a fastenable/openable braking device and automatically controlling the braking device using a controller, or providing an alarm means of informing a driver of the vehicular state, and allowing a driver to judge actuation of the brake in accordance with an instruction supplied from the alarm means. At step 145, the engine speed ωe is increased up to the start-up speed of the engine 1 by increasing the speed of the normally controllable motor. In the stop of the vehicle, since the vehicle is locked at step 144, the vehicle is prevented from being moved backward by the reaction. Further, during running of the vehicle, the engine 1 can be started by increasing the motor speed in accordance with the vehicular speed ωv. At this time, although a negative torque is slightly applied to the vehicle by the reaction against the force for starting the engine 1, the drivability is not reduced because the inertia of the vehicular body is very larger than that of the engine 1. In this way, when the engine speed ωe reaches the start-up speed, the engine 1 can be driven by controlling the engine, for example, through fuel injection control or throttle control. By controlling the speed of the normally drivable motor at step 146, the engine speed ωe of the engine 1 can be controlled at a specific value. Further, since the vehicular torque τv can be controlled by controlling the engine, even if one motor fails, the running of the vehicle is made possible. In addition, since the assisting time and power of the motor are limited depending on the energy stored in the battery 12, the operating method is sometimes limited by the vehicular speed ωv.

At step 141, if it is judged that there is no normally controllable motor, operations in steps 148 to 151 are performed. First, at step 148, it is confirmed whether or not the engine 1 is on rotation. If yes, the engine control is performed at step 149, and the on-off control of the locking device B13 is performed at step 150 for preventing the engine 1 from being stopped. In the case where the engine 1 is not stopped, for example, when the vehicular speed ωv is a medium speed or more, it is desirable to turn on the locking device B13 to lock the sun gear 6s.

If the engine 1 is not on rotation, the vehicle cannot be driven. In this case, at step 151, an operation of turning on a fail lamp is performed. With these operations, since the vehicle can be driven somewhat even in the case where the motors fail, it is possible to enhance the reliability of the vehicle.

In this embodiment, the vehicle can be usually driven in such a region that the input/output of electric energy is minimized and the engine efficiency is maximized, and consequently, it is possible to significantly reduce the fuel consumption. Also, since the function comparable to that of a continuously variable transmission can be obtained by controlling the two motors in co-operation with each other, it is possible to realize a car capable of preventing occurrence of shock due to transmission.

Figure 11:
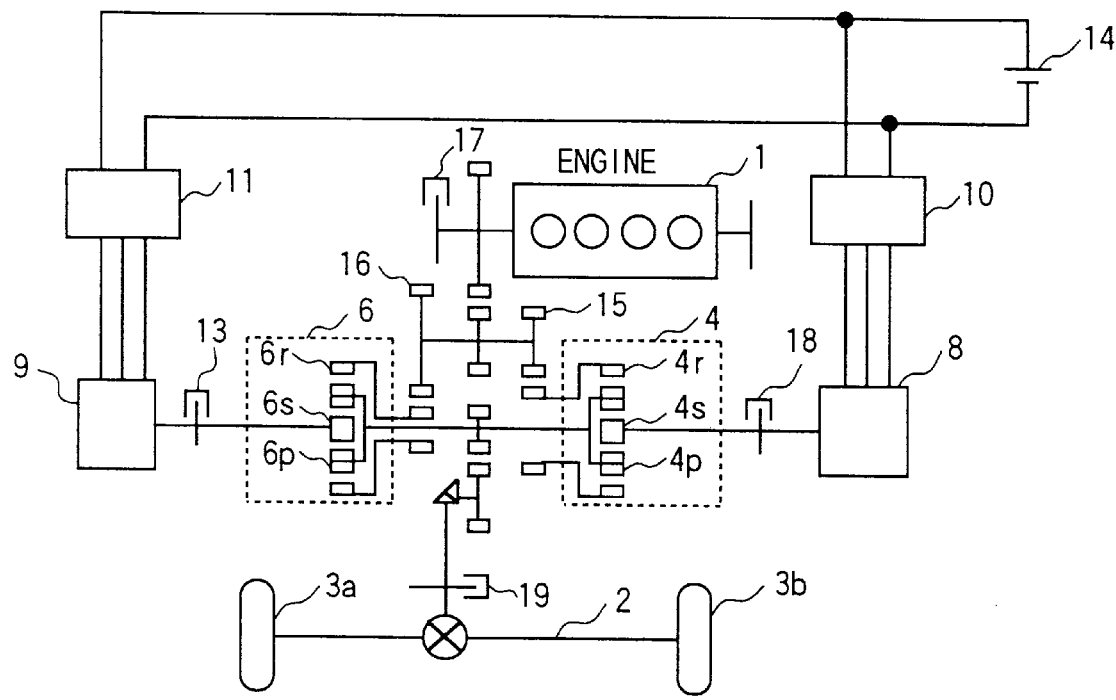
FIG. 11 is a configuration diagram showing another embodiment of the hybrid car in which the gear configuration is different from that shown in FIG. 1.

FIG. 11 shows another embodiment of the hybrid car different from that shown in FIG. 1 in the configuration of the system such as gears. In this system, a capacitor 14 is used in place of the battery 12. Since the power per unit weight of the capacitor 14 can be made larger than that of the battery 12, the weight of the energy storing device mounted on the vehicle can be significantly reduced. This is effective to reduce the weight of the vehicle and hence to further improve the fuel consumption per unit running distance. In addition, since the energy density of the capacitor is smaller than that of the battery, the input/output of the energy of the capacitor 14 may be controlled to be smaller than that of the battery 12 of the embodiment shown in FIG. 1.

This embodiment is also different from the embodiment shown in FIG. 1 in that locking devices 17, 18 and 19 are provided on rotating portions of the engine 1, motor A8 and the vehicle driving shaft; and the gears 5 and 7, shown in FIG. 1, for making different the gear ratio between the planetary gear A4 and the gear 5 from the gear ratio between the planetary gear B6 and the gear 7, are changed into gears 15 and 16.

The locking devices 17, 18 and 19 have the following functions. First, the locking device 17 is used for stopping the rotation of the engine 1. In the case where the vehicle is not driven using the engine 1, the fastening device 17 is turned on for fastening the engine 1. When the control under the motor drive mode is performed in such a state, since it is not required to control the speeds of the motors A8 and B9 in co-operation with other for controlling the engine speed ωe into zero, the vehicular torque τv may be controlled by either or both of the motors. That is to say, it is possible to significantly simplify the method of controlling the motors. Further, in the embodiment shown in FIG. 1, if both the motors are controlled in co-operation with each other, one motor is turned into the driving state and the other motor is turned into the power generating state, so that the input/output electric energy becomes large; however, in this embodiment, the minimum electric energy necessary for driving the vehicle may be utilized, so that the loss in electric energy can be further reduced.

In addition, the locking device 17 may be configured as a one-way clutch. In the case of using the one-way clutch as the locking device 17, even if a torque acting to rotate the engine 1 in the reversed direction occurs during stoppage of the engine 1, the stopping state of the engine 1 can be automatically held by the one-way clutch as the locking device 17. This is advantageous in eliminating the necessity of controlling the locking device 17.

The locking device 18 is used for locking the motor A8. In the first speed mode, the locking device 18 is turned on after the motor A speed ωa is controlled into zero. Then, the control of the motor A8 is stopped. In this way, even in the first speed mode, the engine 1 can be driven without use of any electric energy of the motor, it is possible to further reduce the fuel consumption.

Since the locking device 19 can be controlled for locking the vehicle, the vehicle locking operation at step 143 shown in FIG. 10 can be automatically performed using a controller, so that the start-up of the engine when the motor fails can be performed without giving any burden to a driver.

By changing the gears 5 and 7 shown in FIG. 1 into the gears 15 and 16, not only the same effect can be obtained but also the configuration from the output of the planetary gears A4 and B6 to the drive shaft 2 is simplified. As a result, it is possible to arrange a transmission portion including the motors A8 and B9 around the drive shaft in a compact manner, and hence to freely arrange the engine in an engine room of the vehicle although the vehicle is of the hybrid type.

As described above, according to this embodiment, it is possible to further enhance the efficiency of the system.

Figure 12:
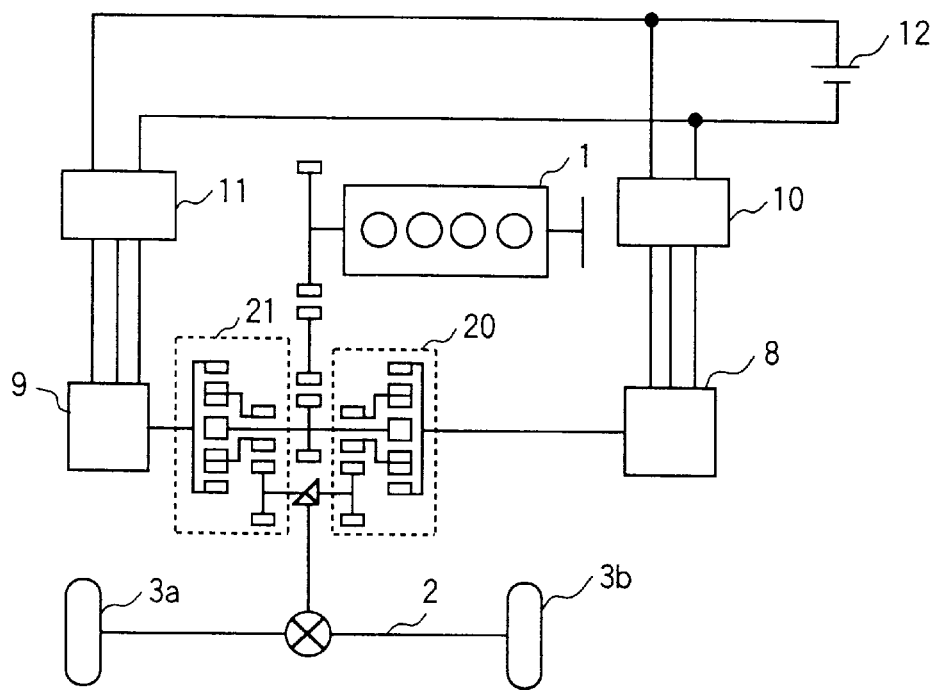
FIG. 12 is a configuration diagram showing a further embodiment of the hybrid car including two planetary gears in which a gear ratio between the input and output sides of one planetary gear is the same as a gear ratio between the input and output sides of the other planetary gear.

FIG. 12 is a configuration diagram showing a further embodiment different from the embodiment shown in FIG. 1. In this system, a gear ratio between the input and output sides of the planetary gear 20 is the same as a gear ratio between the input and output sides of the planetary gear 21. In this system, the effect of establishing the first speed mode and second speed mode by changing the gear ratio is not obtained; however, a new effect can be obtained as a parallel-hybrid car. That is to say, in the case where the drive force of the engine 1 is assisted by the motor using the energy of the battery 12, when the drive torque for assisting the drive force of the engine 1 is small, only one of the motors A8 and B9 may be driven, with a result that the motors can be controlled at the efficient operating points; and when the drive torque for assisting the drive force of the engine 1 is more than the capacity of one motor, both the motors may be used to obtain the drive torque. As a result, it is possible to make compact the system as compared with the related art parallel hybrid car.

Figure 13:
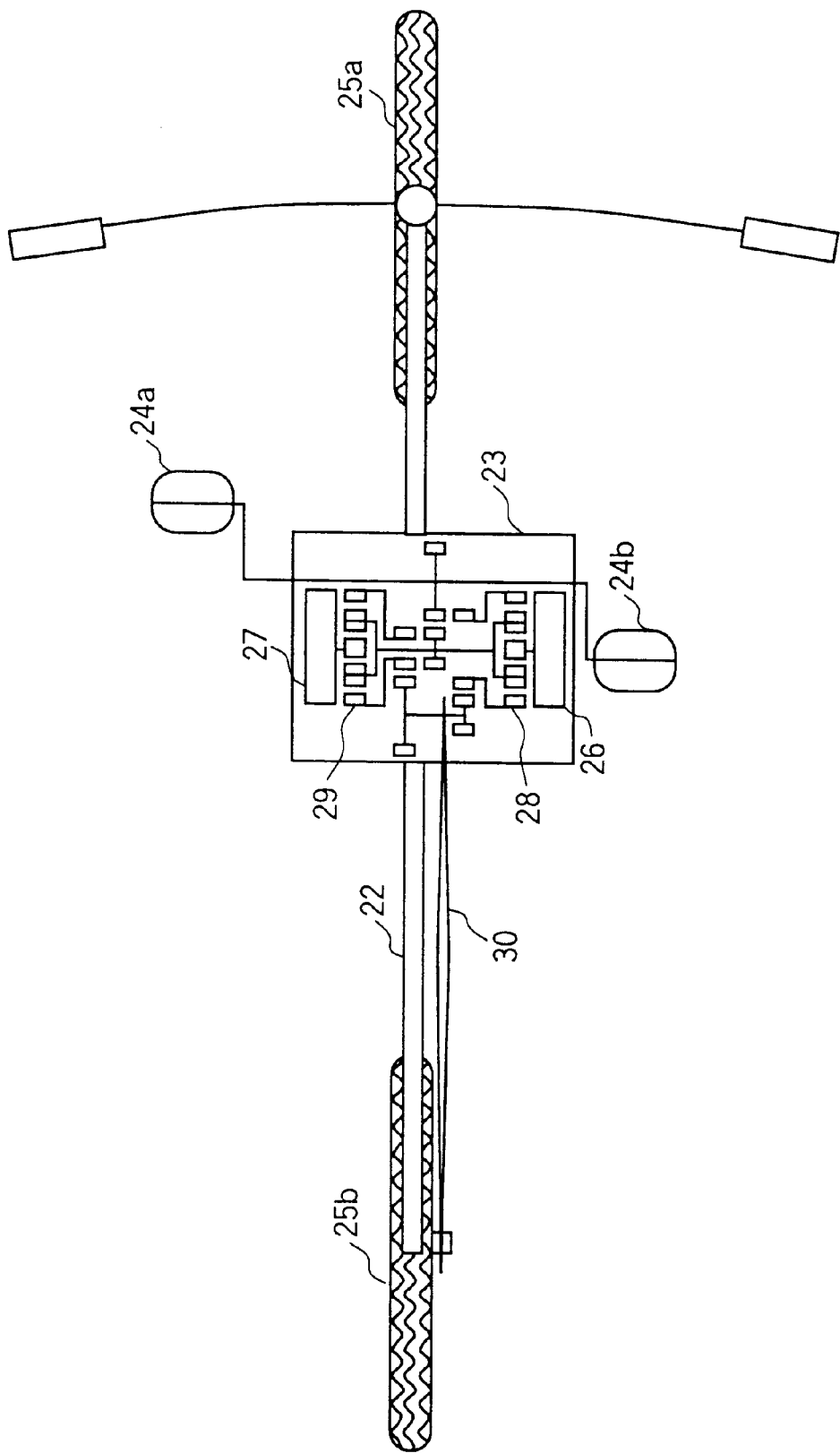
FIG. 13 is a configuration diagram showing one embodiment in which the present invention is applied to a bicycle.

FIG. 13 shows an embodiment in which the transmission of the present invention is applied to a bicycle. A transmission 23 mounted on a body 22 of the bicycle is adapted to vary the speed of a rotational drive force obtained when pedals 24a and 24b are actuated by a driver. The rotational drive force thus varied in its speed is transmitted to a tire 25b of a rear wheel via a chain 30, to thereby move the bicycle forward. The transmission 23 is composed of thin motors 26 and 27 and planetary gears 28 and 29 controlled by the motors 26 and 27. Like the embodiment shown in FIG. 1, it is possible to realize a first speed mode, second speed mode, and CVT mode by making different a gear ratio between input and output sides of the planetary gear 28 from a gear ratio between input and output sides of the planetary gear 29. And, the motors 26 and 27 are controlled at a speed varying ratio desired by a driver using a speed varying indicator (not shown), so that the driver enjoys mostly comfortable operation of the vehicle. In this way, according to this embodiment, there can be provided a bicycle having a comfortable drivability. Also, by mounting energy storing device on the bicycle, the bicycle can easily climb a sloping road at the optimum speed varying ratio using energy gradually charged during running on a down-hill or a flat road.

Figure 14:
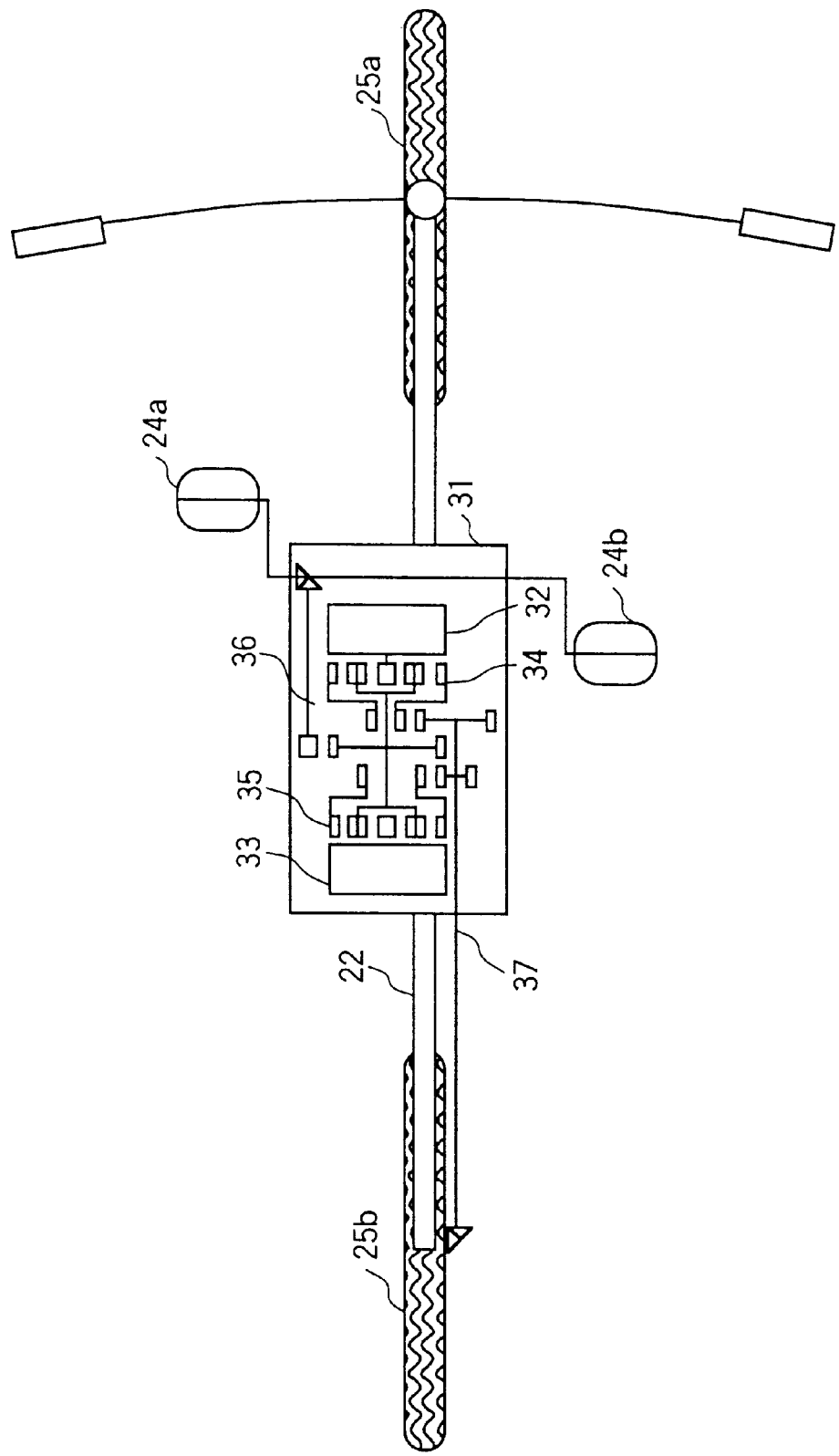
FIG. 14 is a configuration diagram showing another embodiment in which the present invention is applied to a bicycle including a drive system without use of any chain.

FIG. 14 is a further embodiment in which the rotational direction of a transmission is changed 90° from that in the embodiment shown in FIG. 13. This embodiment is different from the embodiment shown in FIG. 13 in that the arrangement direction of a transmission 31 is changed 90° and a drive force is transmitted to the tire 25b via a shaft 37 in place of the chain 30. The rotational drive force of the pedals 24a and 24b is transmitted to the shaft 36 via a bevel gear and is inputted in the transmission 31. The transmission 31 is composed of motors 32 and 33 and planetary gears 34 and 35, and it has a transmission function like the previous embodiment; however, the rotational direction of the transmission is a transverse direction perpendicular to the advancing direction of the bicycle. Since the rotational drive force varied in its speed is transmitted to the tire 25b via the shaft 37, it is possible to eliminate the necessity of using the chain. This is effective to obtain a bicycle having a good transmission efficiency with a simple structure. In the embodiment shown in FIG. 14, since the width of the transmission arranged between the pedals can be made smaller than that in the embodiment shown in FIG. 13, the mounting characteristic of the transmission on the bicycle can be also enhanced. According to this embodiment, the driver is able to drive the bicycle while stepping the pedals with a lighter force. In addition, by arranging the transmission with its rotational shaft in the vertical direction, a gyro effect can be given to the transmission, so that the posture of the bicycle can be stabilized.

In the above-described embodiments, the transmission including the two planetary gears controlled by the motors, and the hybrid car and bicycle using the transmission have been described. Additionally, the present invention makes it possible to realize a multi-stage (three-stage or more) transmission by use of three pieces or more of planetary gears. In the above embodiments, there is described the method in which the motor mainly controls the sun gear of the planetary gear; however, there can be adopted a method in which the motor controls another gear. Further, for example, there can be adopted an asymmetric configuration in which the sun gear of one planetary gear is controlled by the motor and the planetary element of the other planetary gear is controlled by the motor. While the planetary gear is used as the differential mechanism in the above embodiments, it can be replaced with a general differential gear, and further it may be replaced with a harmonic gear by putting emphasis on the stillness. Further, the present invention can be of course applied not only to cars but also to ships and railcars.

According to the present invention, there is provided a transmission including: a mechanism for distributing energy of a drive source into a plurality of differential mechanisms; a plurality of motors connected to the plurality of differential mechanisms, respectively; and a mechanism for combining energies outputted from the plurality of differential mechanisms, or a transmission including: a plurality of differential mechanisms in each of which a difference in the number of rotation between an input shaft and an output shaft is controlled by a motor; wherein the input shafts of the plurality of differential mechanisms are taken as a common shaft, and the output shafts of the plurality of differential mechanisms are taken as a common shaft. The transmission having the above configuration makes it possible to realize the continuously variable transmission function using the motors, and to enhance the efficiency by minimizing a loss in electric energy.

According to the present invention, there is also provided a vehicle including: an engine for generating drive energy for driving a vehicle; first and second planetary gears each of which is composed of a sun gear, a planetary element, and a ring gear; and first and second motors for controlling the sun gears of the first and second planetary gears, respectively; wherein one of the planetary element and the ring gear of each of the first and second planetary gears is connected to an input shaft driven by the engine and the other is connected to an output shaft for driving a vehicular body. The vehicle having the above configuration makes it possible to realize a continuously variable transmission function capable of transmitting a drive torque by the mechanical gears without use of electric energy except for acceleration and usually drive the engine at a high efficient operational point, and hence to reduce the fuel consumption per unit running distance.

According to the present invention, there is also provided a bicycle including: first and second differential mechanisms each of which takes a drive force generated by a driver as an input force and takes a drive force for driving a wheel as an output force; and first and second motors for controlling the first and second differential mechanisms, respectively. The bicycle having the above configuration makes it possible to reduce fatigue of a driver during running of the bicycle.

What is claimed is:

1. A transmission comprising:
a plurality of differential mechanisms;
a mechanism operatively arranged for distributing energy of a drive source into said plurality of differential mechanisms;
a plurality of motors connected to said plurality of differential mechanisms, respectively; and
a mechanism for combining energies outputted from said plurality of differential mechanisms.

2. A transmission comprising:
a plurality of differential mechanisms in each of which a difference in the number of rotation between an input shaft thereof and an output shaft thereof is controlled by a motor;
wherein said input shafts of said plurality of differential mechanisms are a first common shaft, and said output shafts of said plurality of differential mechanisms are a second common shaft.

3. A vehicle comprising:
an engine for generating drive energy for driving said vehicle; and
a transmission for changing the speed of rotation of said engine and transmitting the rotational drive force thus speed-changed to a wheel and having
first and second differential mechanisms, each of which takes at least a drive force generated by said engine as an input force and takes a drive force for driving said wheel as an output force; and
first and second motors for controlling said first and second differential mechanisms, respectively.

4. A vehicle comprising:
an engine for generating drive energy for driving said vehicle;
first and second planetary gears each of which is composed of a sun gear, a planetary element, and a ring gear; and
first and second motors for controlling said sun gears of said first and second planetary gears, respectively;
wherein one of said planetary element and said ring gear of each of said first and second planetary gears is connected to an input shaft driven by said engine and the other of said planetary element and said ring gear is connected to an output shaft for driving a vehicular body.

5. A vehicle according to claim 3, further comprising means for storing energy for driving said first and second motors.

6. A vehicle according to claim 5, wherein a gear ratio between said common input shaft and said common output shaft of said first differential mechanism is larger than a gear ratio between said common input shaft and said common output shaft of said second differential mechanism.

7. A vehicle according to claim 5, wherein means is providing for starting said engine by controlling said first and second motors using the energy of said energy storing means.

8. A vehicle according to claim 6, wherein means is provided for starting said engine with a vehicular speed kept constant by controlling said first and second motors.

9. A vehicle according to claim 6, wherein means is provided for driving said vehicle with said engine stopped by controlling said first and second motors.

10. A vehicle according to claim 6, wherein means is provided for establishing in said vehicle a first operational mode in which said first motor is locked and said second motor is turned into a free-run state when said vehicle is driven by said engine, and a second operational mode in which said first motor is turned into a free-run state and said second motor is locked when said vehicle is driven by said engine.

11. A vehicle according to claim 10, wherein said second motor comprises a fastening means for mechanically fastening said second motor.

12. A vehicle according to claim 10, wherein each of said first and second motors comprises a fastening means for mechanically fastening said motor.

13. A vehicle according to claim 11, wherein when the operational mode of said vehicle is changed into said first or second operational mode, said fastening means is arranged to mechanically fasten a shaft of said first or second motor after said motor is electrically locked.

14. A vehicle according to claim 6, wherein when said vehicle is driven by said engine, said first motor is in a power-running state, and said second motor is in a power-running or regenerative state.

15. A vehicle according to claim 6, wherein when said vehicle is driven by said engine, said first motor is turned into a power-running state using energy generated by said second motor.

16. A vehicle according to claim 3, wherein when one of said first or second motor becomes uncontrollable, said vehicle is configured to be driven by a controllable one of said first and second motors and said engine.

17. A vehicle according to claim 3, wherein when it is confirmed upon stopping of said vehicle that said first or second motor becomes uncontrollable, said engine is configured to be started by a controllable one of said first and second motors, and-thereafter said vehicle is driven by controlling said controllable motor and said engine.

18. A vehicle according to claim 4, wherein a gear ratio between said output side gear and said output shaft of said first planetary gear is different from a gear ratio between said output side gear and said output shaft of said second planetary gear.

19. A bicycle comprising:
first and second differential mechanisms each of which takes a drive force generated by a driver as an input force and takes a drive force for driving a wheel as an output force; and
first and second motors for controlling said first and second differential mechanisms, respectively.

20. A transmission comprising:
a plurality of differential mechanisms having input shafts as a first common shaft and output shafts as a second common shaft; wherein at least one of said plurality of differential mechanisms controls a difference in the number of rotation between said common input shaft and said common output shaft by a first motor, and at least one of the others of said plurality of differential mechanisms performs torque control by a second motor.

21. A transmission comprising:
plurality of differential mechanisms, having input shafts as a first common shaft and output shafts as a second common shaft, each of said plurality of differential mechanisms being composed of at least three gear elements; and
a plurality of motors, each of which is connected to a shaft of one, different from those connected to said common input shaft and said common output shaft, of said at least three gear elements of each of said plurality of differential mechanisms.

22. A vehicle comprising:
an engine;
first and second planetary gears, each being composed of a sun gear, a planetary element, and a ring gear; and
first and second motors for controlling said sun gears of said first and second planetary gears, respectively;
wherein one of said planetary element and said ring gear of each of said first and second planetary gears is connected to an input shaft driven by said engine and the other is connected to an output shaft for driving a vehicular body.

23. A vehicle comprising:
an engine;
plurality of differential mechanisms to which a drive force of said engine is operatively inputted;
a drive mechanism for driving said vehicle by the output of said plurality of differential mechanisms;

a plurality of motors operatively connected to said plurality of differential mechanisms, respectively; and a locking device for stopping rotation of said engine.

24. A vehicle according to claim 4, further comprising means for storing energy for driving said first and second motors.

25. A vehicle according to claim 12, wherein when the operational mode of said vehicle is changed into said first or second operational mode, said fastening means is arranged to mechanically fasten a shaft of said first or second motor after said motor is electrically locked.

26. A vehicle according to claim 4, wherein when one of said first or second motor becomes uncontrollable, said vehicle is configured to be driven by a controllable one of said first and second motors and said engine.

* * * * *